(12) United States Patent
Mitsch

(10) Patent No.: US 12,404,910 B2
(45) Date of Patent: Sep. 2, 2025

(54) FREQUENCY-ADAPTIVE LEAF-SPRING TUNED MASS DAMPER

(71) Applicant: FM ENERGIE GMBH & CO.KG, Heppenheim (DE)

(72) Inventor: Franz Mitsch, Heppenheim (DE)

(73) Assignee: FM ENERGIE GMBH & CO. KG, Heppenheim (DE)

( * ) Notice: Subject to any disclaimer, the term of this patent is extended or adjusted under 35 U.S.C. 154(b) by 407 days.

(21) Appl. No.: 17/908,582

(22) PCT Filed: Mar. 1, 2021

(86) PCT No.: PCT/EP2021/025079
§ 371 (c)(1),
(2) Date: Sep. 1, 2022

(87) PCT Pub. No.: WO2021/175491
PCT Pub. Date: Sep. 10, 2021

(65) Prior Publication Data
US 2023/0296155 A1 Sep. 21, 2023

(30) Foreign Application Priority Data
Mar. 3, 2020 (EP) ..................................... 20000093

(51) Int. Cl.
*F16F 1/22* (2006.01)
*F03D 80/00* (2016.01)
(Continued)

(52) U.S. Cl.
CPC ............ *F16F 7/1005* (2013.01); *F03D 80/00* (2016.05); *F16F 7/116* (2013.01);
(Continued)

(58) Field of Classification Search
CPC ...... F16F 7/1005; F16F 7/116; F16F 2222/08; F16F 2228/066; F16F 2230/18;
(Continued)

(56) References Cited

U.S. PATENT DOCUMENTS 8,540,224 B2 * 9/2013 Guthrie .................... B60N 2/24
267/164
8,668,189 B2 * 3/2014 Guthrie .................... F16F 1/18
267/164
(Continued)

FOREIGN PATENT DOCUMENTS

DE 20 2011 000 635 U1 8/2012
DE 20 2012 105 031 U1 5/2014
(Continued)

OTHER PUBLICATIONS

International Search Report Corresponding to PCT/EP2021/025079 mailed Jun. 21, 2021.
(Continued)

*Primary Examiner* — Thomas W Irvin
(74) *Attorney, Agent, or Firm* — Finch & Maloney PLLC

(57) ABSTRACT

The invention relates to a tuned mass damper or vibration damper which, with the aid of an assembly (2) of a plurality of stacked, specially shaped or bent leaf springs (2.1), can be adapted over a certain range to the disturbance frequencies acting on a component to be damped or of the vibration system to be damped, the position of the damper mass (1, 34) being changed essentially only slightly. The invention relates in particular to one- and two-dimensionally effective tuned mass dampers. The tuned mass dampers according to the invention are suitable in particular for installations, vehicles and machines that undergo frequent changes in rotational speed, resulting frequently in disturbance frequen-
(Continued)

cies that become noticeable, in particular, in the form of structure-borne sound, or other vibrations.

22 Claims, 10 Drawing Sheets

(51) Int. Cl.
  *F16F 7/10* (2006.01)
  *F16F 7/116* (2006.01)
  *F16F 15/14* (2006.01)
(52) U.S. Cl.
  CPC .... *F16F 15/1428* (2013.01); *F05B 2260/964* (2013.01); *F16F 2222/08* (2013.01); *F16F 2228/066* (2013.01); *F16F 2230/18* (2013.01); *F16F 2232/02* (2013.01); *F16F 2236/08* (2013.01); *F16F 2238/022* (2013.01)
(58) Field of Classification Search
  CPC ............... F16F 2232/02; F16F 2236/08; F16F 2238/022; F16F 1/22; F03D 80/00; F05B 2260/964; Y02B 10/30; Y02E 10/72
  See application file for complete search history.

(56) References Cited

U.S. PATENT DOCUMENTS

| | | | |
|---|---|---|---|
| 9,217,482 B2* | 12/2015 | Schürmann | F16F 1/3686 |
| 9,689,453 B2* | 6/2017 | Choy | F16F 7/1011 |
| 9,739,335 B2 | 8/2017 | Melcher et al. | |
| 9,810,278 B2* | 11/2017 | Huang | F16F 1/027 |
| 10,308,354 B2* | 6/2019 | Black | F16F 7/1011 |
| 10,543,911 B2* | 1/2020 | Black | F16F 7/1011 |
| 2011/0033310 A1* | 2/2011 | Badre-Alam | F16F 1/20 310/15 |
| 2011/0209958 A1* | 9/2011 | Badre-Alam | F16F 3/12 267/164 |
| 2013/0311012 A1* | 11/2013 | Black | H02K 33/00 701/3 |
| 2020/0332548 A1 | 10/2020 | Mortensen et al. | |

FOREIGN PATENT DOCUMENTS

| | | |
|---|---|---|
| EP | 1 008 747 A2 | 6/2000 |
| EP | 1 327 726 A1 | 7/2003 |
| EP | 2 816 177 A1 | 12/2014 |
| EP | 3 519 644 A1 | 8/2019 |
| JP | S62-2033 A | 1/1987 |
| WO | 2017/186343 A1 | 11/2017 |

OTHER PUBLICATIONS

Written Opinion Corresponding to PCT/EP2021/025079 mailed Jun. 21, 2021.

\* cited by examiner (a)

(b)

(a)

(b)

FREQUENCY-ADAPTIVE LEAF-SPRING TUNED MASS DAMPER

The invention relates to a tuned mass damper or vibration damper which, with the aid of an assembly of a plurality of stacked, specially shaped or bent leaf-springs, can be adapted over a certain range to the disturbance frequencies acting on a component to be damped or of the vibration system to be damped, the position of the damper mass being changed essentially only slightly. The invention relates in particular to one- and two-dimensionally effective tuned mass dampers. The tuned mass dampers according to the invention are suitable in particular for installations, vehicles and machines that undergo frequent changes in rotational speed, resulting frequently in disturbance frequencies that become noticeable, in particular, in the form of structure-borne sound, or other vibrations.

Tuned mass dampers for reducing unwanted vibrations in machines, systems or their components are generally known in the prior art. Numerous solutions have been proposed for this. Most of these solutions are associated with a desired relatively strong passive damping of the excited system, as described for example in EP 1 008 747, EP 1 327 726 or EP 2 816 177. The essential functional part of these systems consists of an elastomer, which has an intrinsic damping effect. The advantage of these systems is that the corresponding dampers can be used over a wide frequency range, including the occurring natural frequencies, so that they do not cause any major disruptions to the system. However, these systems only work efficiently if the speeds of the rotating parts do not change or do not change significantly. However, rotating systems with varying speeds tend, among other things, to increased or amplified structure-borne sound, which is particularly undesirable in the case of wind power plants.

WO 2017/186343 A1 describes a leaf-spring damper that is effective in a selected direction. In this case, a pre-tensioning element is arranged on the first flat side of a leaf-spring, which is connected to the damper mass, and a roller unit is attached to the second flat side of the leaf-spring, which is arranged between the leaf-spring and a surface of the damper mass and can be moved up and down along the leaf-spring and fixed by the biasing element in a certain selected and variable position along the leaf-spring. This defines the length of the leaf-spring that is effective in terms of vibration and thus also the frequency of the machine unit that vibrates perpendicularly thereto and is to be damped by this frequency. Although this one-dimensionally effective absorber works very effectively, it is often difficult to set and must be readjusted relatively frequently because of the mechanically moving parts on or at the leaf-spring.

The object is thus to provide a leaf-spring tuned mass damper which, in an analogous manner, provides optimum damping over a wide frequency range, e.g. by frequency-dependent introduction of force at changing speeds of the rotating components involved in the system, which however does not have the disadvantage of a difficult or frequent readjustment of the device due to frequency changes that have occurred.

The object is achieved by the tuned mass damper described below and characterized in the claims.

The subject matter of the invention is therefore a tuned mass damper for damping vibrations, in particular in the range between 50 and 500 Hz in vehicles, machines and installations, in particular wind turbines, which essentially comprises:

(i) a regularly or irregularly shaped damper mass (1) made up of one or more units,
(ii) one or more leaf-spring assemblies (2), consisting essentially of at least one, but preferably of two or more, in particular three, four, five, six or more, individual, stacked leaf-springs (2.1) of predetermined stiffness, as well as
(iii) a device, in particular a displacement device (5),(6), (14)-(18), or an electrical or thermal device with this function, such as a piezo element or a bimetallic element to change the predetermined stiffness of the leaf-spring assembly (2) and thus for the frequency adjustment of the vibration system depending on the occurring disturbance frequencies, which is connected both to the leaf-spring assembly (2) and to the support device (11) of the vibration system, wherein the leaf-spring assembly is designed and arranged in a particular manner and is connected both with a support unit (11) of the vibration system (installation, machine, vehicle) as well as with the damper mass (1) in such a way that in the excited state with power flow in a specific direction, no mechanically moving parts are involved.

Thus, the damper device according to the invention requires little maintenance with only little wear, in contrast to the solution of WO 2017/186343 A1, which discloses an absorber with a leaf-spring, the length of which can be shortened or lengthened during operation by a displacement device.

The leaf-spring assembly (2) of the tuned mass damper according to the invention has the following special features:

(a) one, preferably two or more leaf-springs (2.1) stacked in parallel or one on top of the other, directly touching or not directly touching, which are pre-bent about their transverse axis in the force-free state, the longitudinal axis of the leaf-springs or the leaf-spring assembly being defined by the direction (2.1.3) of the force applied during operation, with the bending of the leaf-spring assembly (2) or the leaf-springs (2.1) being S-shaped, preferably S-shaped with a central symmetry, and
(b) two end regions (2.1.1) in the longitudinal direction, via which they are tensioned, and which are arranged parallel to one another but are deflected or offset from one another by a defined, preset amount (2.1.2) with respect to their position in relation to the longitudinal axis, wherein this predetermined deflection (initial deflection) corresponds to a specific stiffness of the leaf-spring assembly and thus to a specific frequency of the vibration system connected to the leaf-spring assembly. One end region is connected directly or indirectly to the damper mass (1), which is arranged in such a way that it can vibrate in the direction of the longitudinal axis of the leaf-spring assembly. According to the invention, the other end region (2.1.) of the leaf-spring assembly (2) is connected to said device for changing the stiffness of the leaf-spring assemblies (2), which is arranged on the support device (11) and can be operated there.

Depending on the embodiment, the leaf-spring assembly (2) can be deflected differently by means of the device mentioned, for example by a displacement or rotating device (5)(6)(14-18), or a device that has the same effect.

A displacement or rotation device (5)(6) in connection with the damper mass (1) is caused by shifting or rotating of the mass in relation to the support unit (11) of the vibration system, a bending of the leaf-spring assembly (2) or of the package of leaf-springs (2.1) in a direction perpendicular to its longitudinal axis ((2.1.6, direction of deflection) or in the direction of displacement (8) or rotating (19). Depending on the direction of displacement or direction of rotation, this in turn leads to an increase or decrease in the value of the preset deflection (2.1.2). As a result, the predetermined stiffness of the leaf-spring assembly can be changed along its longitudinal axis and the frequency of the vibration system can thus be adapted to a changed disturbance frequency. By means of a corresponding positive or negative bending of the leaf-spring assembly (corresponding to a positive or negative displacement or torsion), a corresponding adjustment of the frequency of the damper to a varying speed of the machine, system or vehicle and thus to the correspondingly changing disturbance frequency can be achieved. According to the invention, the frequency is set simply by bending the leaf-spring assembly (2) by the displacement device (5)(6) or the rotating device (14-18).

As mentioned, the bending or deviating of the leaf-spring assembly can also occur by a piezo element which is attached to one side or both sides of the leaf-spring assembly. When a high voltage is applied, the excited piezo elements expand, resulting in a corresponding bending of the leaf-spring assemblies. A doubling of the setting range can be achieved by a correspondingly directed excitation of the piezo elements on both sides.

Alternatively, the leaf-springs (2) can be composed of two metals with different thermal expansion (bimetallic element). When exposed to temperature—passively due to the ambient temperature or actively by means of heating elements—the leaf-springs bend accordingly, so that their stiffness and thus the frequency of the vibration system can be influenced.

The leaf-spring assembly usually consists of a thicker or preferably several thin (1-2 mm) leaf-springs, which are stacked congruently one on top of the other. The individual leaf-springs are usually separated from one another by a small distance (≤2 mm, in particular ≤1 mm), i.e. they have gap-like intermediate spaces, but they can also lie directly on top of one another. In the latter case, additional damping of the system is generated by the friction that occurs during bending.

In one embodiment of the invention, the intermediate spaces between the leaf-springs of a leaf-spring assembly can also be filled with elastic layers, which must be able to absorb without damage the sometimes considerable shearing forces that occur when the leaf-springs are bent. In another embodiment of the invention, individual or all leaf-springs of the leaf-spring assembly can have central recesses of a round or oval shape to influence and optimize the desired stiffness and to reduce the mass to increase the natural frequency of the leaf-spring (2.1.4). Conversely, a mass can also be attached to the leaf-springs in order to reduce their natural frequencies.

The leaf-spring assemblies or the individual leaf-springs for the tuned mass damper according to the invention are preferably rectangular, with the base region, which is rectangular in outline, as described, naturally having an S-shaped bend, preferably centrally and symmetrically along the longitudinal axis. However, the leaf-springs can also have outlines of any regular or irregular shape and size depending on their function, space requirements and arrangement in a particular machine or installation.

It has been found that tuned mass dampers with a leaf-spring assembly or leaf springs which, in the pre-bent, force-free state, have a deflection (initial deflection) relative to the longitudinal axis (2.1.2) of 10-40%, preferably 15-30%, of the free spring length (2.1.5) in the direction of the longitudinal axis or in the direction of loading (2.1.3) of the leaf-springs are particularly effective in dampening disturbance frequencies between 50 and 500 Hz, preferably between 100 and 300 Hz. For example, leaf-spring assemblies with a free spring length (2.1.5) of 50-500 mm, preferably 100 of 300 mm, can be used for conventional wind power installations, depending on the size of the installation.

Two or more leaf-spring assemblies (2) are usually used in the tuned mass dampers according to the invention, depending on the desired damping. In principle, however, it is possible to equip a functioning tuned mass damper according to the invention with only one leaf-spring assembly. Preferably, however, at least two leaf-spring assemblies are used for each damper. It also depends on whether the damper should only be effective in one direction (linear damper) or also in a plane.

The subject matter of the invention is therefore an adaptive, one-dimensionally effective tuned mass damper, which has at least two leaf-spring assemblies (2) arranged in parallel, which each have their first end or clamping region (2.1.1) connected to the damper mass (1) at opposite points and their second end or clamping region (2.1.1) are firmly connected to the support unit (11).

The damper mass (1) is formed by one or more plates packed together between the leaf-spring assemblies and is arranged in such a way that it can essentially only vibrate in a specific direction (9) to be determined, for example in the vertical direction.

In a preferred embodiment, the device for changing the predetermined stiffness of the leaf-spring assembly (2) is a mechanical, hydraulic, pneumatic or electrical displacement device (5)/(6), which is connected on the one hand to the support unit (11) and on the other hand to the damper mass (1), wherein the damper mass (1) connected to the leaf-spring assembly can be displaced back and forth in a direction (8) (displacement direction) perpendicular to the vibration direction (9). For example, if the direction of vibration of mass (1) is vertical, the direction of displacement is horizontal. Such a shift can increase or decrease the predetermined original deflection (2.1.2) of the pre-bent leaf-springs by reversible deformation in the bending direction (2.1.6), and thus the stiffness of the leaf-spring assembly can be influenced.

As mentioned, the mass (1) is shifted in the direction (8). In order that the damper mass (1) of such a one-dimensional damper does not tilt when the leaf-springs are bent by means of the shifting device (5)(6) and remains aligned in the same way relative to the support device (11) and the at least two leaf-spring assemblies, it is provided according to the invention to provide guide springs (3) (4) on the damper mass (1), which are arranged parallel to the displacement direction (8) of the damper mass (1), and not significantly impede the vibrations of the mass (1). The guide springs are leaf-springs that can be easily moved in the direction (9) and have a high degree of stiffness in the direction of movement (8) in order to bring the mass (1) exactly into the predetermined position (5)(6). At the same time, the mass is fixed as required in the direction (13) by the guide springs. Thus, the mass only has the stiffness predetermined by the leaf-spring assembly (2) in the direction (9) and is blocked in the other directions.

As already mentioned, it is also possible to install more than two leaf-spring assemblies in a tuned mass damper according to the invention. It is also possible to use three or more leaf-spring assemblies, which can be arranged in such a way that the damper is not only effective in a linear direction, but also in a defined plane. Such an embodiment is also the subject of the invention. The damper mass (1) is formed by a mass ring which is concentric around a concentrically mounted support unit (11).

The object of the invention is therefore in detail a two-dimensionally effective tuned mass damper which has more than two, preferably three to eight leaf-spring assemblies (2), which are arranged in a star shape and at an equal or different distance angle from one another and are firmly connected outwards via their first end or clamping region (2.1.1) to the ring-shaped damper mass (1) arranged concentrically around the support unit (11). The other end or clamping region (2.1.1) of the individual leaf-spring assemblies (2) is connected directly to the concentrically mounted support unit (11), which also has a rotating device (14-18). The ring-shaped damper mass is arranged in such a way that it is able to vibrate in a plane radially to the concentrically mounted support unit (11). The bending of the individual circularly arranged leaf-spring assemblies of this embodiment takes place by rotating the concentrically mounted support device in relation to the damper mass (1) by means of said rotating device on the support component (11), so that a change in the predetermined deflection (2.1.2) by reversible deformation in the bending direction (2.1.6) of all radially and star-shaped arranged leaf spring assemblies (2) and thus a change in their stiffness is achieved. The angle between the individual leaf-spring assemblies arranged in a star shape is preferably identical if uniform damping in the plane is required. The angle can also be different if a different damping effect is to be achieved in a selected direction.

The inventive principle presented here can also be used for systems with rotating components or machines and vibrations generated thereby. In a special embodiment, said leaf-spring assemblies (2) are arranged tangentially to the rotating unit. Two leaf-spring stars could also be arranged one above the other, which rotate against each other and are connected to a common mass.

The subject matter of the invention is therefore also a corresponding tuned mass damper, in which the damper mass (34) is arranged in a ring around a concentrically mounted support unit of the machine (30) or the machine itself, which executes circular vibrations when excited by disturbance frequencies. The ring-shaped damper mass (34) consists of at least two, preferably three, four, five, six or more circle segments, which are connected to one another by a corresponding number of leaf-spring assemblies (2), said leaf-spring assemblies (2) being arranged tangentially in relation to their longitudinal axis in such a way that they have a damping effect on rotational vibrations of the support unit or the machine (30), as is described in more detail above and below. Here, too, the tangentially installed leaf-spring assemblies are preferably distributed symmetrically or evenly around the circular shape if a direction-independent damping effect is to be achieved.

If necessary or desired, the tuned mass dampers according to the invention can also have additional damping elements known per se. Such damping elements can be, for example, elastomer dampers, hydraulic dampers, eddy current dampers or pneumatic dampers.

The tuned mass dampers according to the invention are characterized, among other things, by the fact that when a force is applied in the intended direction, the ratio of the initiated vibration travel of the damper mass (1) to the initiated vibration travel of the vibration system to be damped is >50, >100, >200, or >300, with said ratio generally taking on values between 100 and 400 in the undamped state under normal operating conditions.

The tuned mass dampers according to the invention are further characterized in that when the pre-bent leaf-spring assembly (2) is deflected by, for example, 30% compared to the original pre-bent deflection (2.1.2) in the direction that increases the stiffness of the leaf-spring assembly under load, on average approximately a doubling up to a three-fold increase in frequency compared to the frequency of the initial travel is achieved. Conversely, if the pre-bent leaf-spring assembly (2) is deflected by 30% of the original deflection (2.1.2) in the opposite direction, i.e. in the direction that reduces the stiffness of the leaf-spring assembly under load, the frequency can be reduced by 20-50% compared to the initial deflection. In both cases, the respective value depends on the selected initial stiffness of the leaf-spring assembly or the leaf-springs.

The tuned mass dampers according to the invention described herein can be used to reduce or eliminate disturbance frequencies in a machine, a vehicle or an installation, which are caused in particular by rotating components of a transmission, generator, drive train or rotor blades or rotor hubs.

DETAILED DESCRIPTION OF THE EMBODIMENTS

Figure 1:
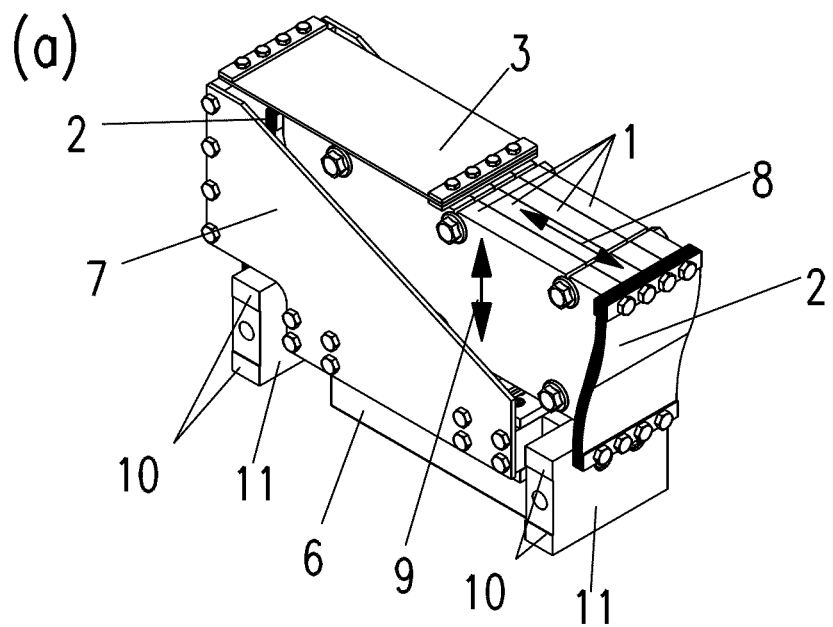
FIGS. 1(a), (b): show perspective views of a one-dimensional effective tuned mass damper according to the invention.
Figure 1:
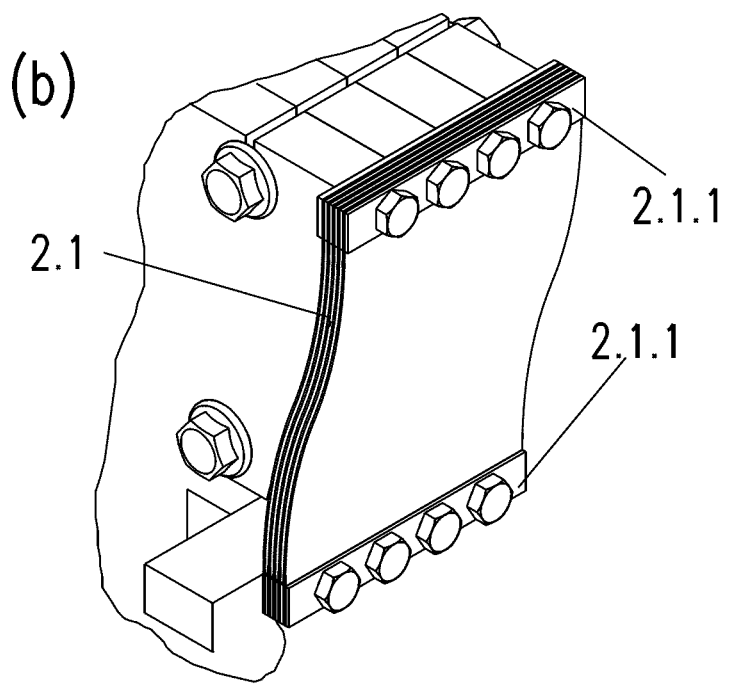
Figure 2:
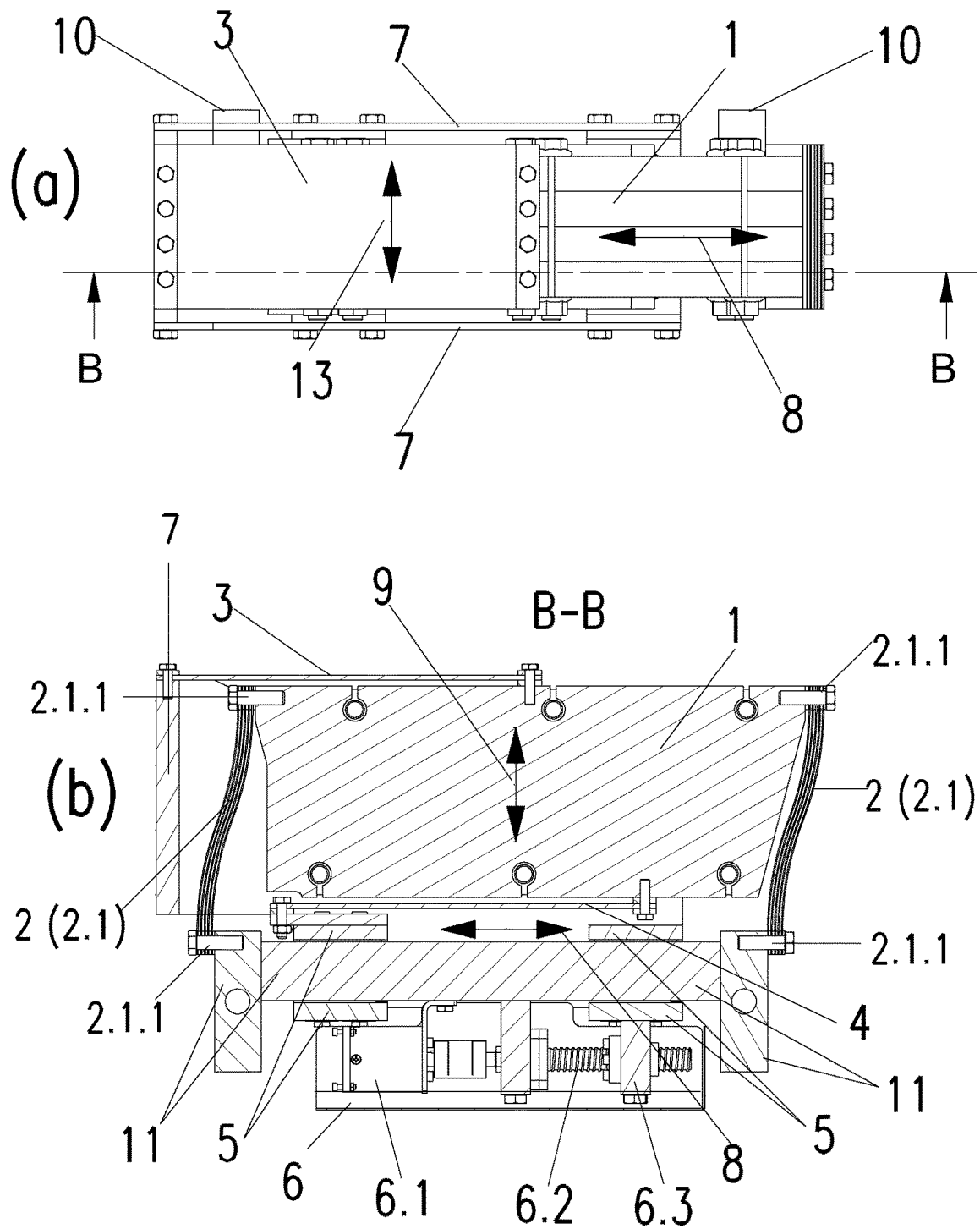
FIG. 2(a): shows a top view of the one-dimensional mass damper according to the invention.
FIG. 2(b): shows a sectional view of the one-dimensional mass damper according to the invention.

FIG. 1 (a), (b) shows two different perspective views of an inventive, one-dimensional effective tuned mass damper. The damper mass (1) consists of several interconnected rectangular plates, the number and mass of which can be selected according to requirements. The package of mass plates (1) is delimited on the two lateral surfaces by two leaf-spring assemblies (2) which are composed of several leaf-springs (2.1) stacked on top of one another, in this case five of them. The leaf-springs are pre-bent centrally and in the same direction in an S-shape, with their two (upper and lower) end or clamping regions being aligned parallel but offset to one another. In this embodiment, the individual leaf-springs are separated from one another by a small distance/gap (<2 mm). Each of the two leaf-spring assemblies is arranged in such a way that the upper end region (2.1.1) of the arrangement is attached to the side of the damper mass plates (1), while the lower end or clamping region (2.1.1) is firmly connected to the support unit (11) of the vibration system (system, machine, etc.). The support unit (11) has two fastening surfaces (10) for the vibration system to be damped. FIG. 1 (a) also shows an upper guide spring (3) which is firmly connected at one position to the package of mass plates (1) and which causes the mass plates, which vibrate in the vertical direction (9) during operation, to prevent jamming or breaking due to a force. The guide spring (3) is connected to a lower guide spring (4) via a support plate (7) (not shown here), which is attached to the underside of the damper mass (1) and has the same task as the upper guide spring (3). FIG. 2 (a) shows the view from above of the tuned mass damper according to the invention, as described in FIG. 1. The guide spring plate (3) is held by two guide spring support plates (7) so that the mass unit (1) cannot move in the transverse direction (13, vertical double arrow) when force is applied. The direction (8) is also shown, in which the damper mass moves when the displacement device is moved (5)(6) (not shown) by bending the leaf-spring assemblies (2). FIG. 2 (b) shows a side view of the tuned mass damper according to the invention from FIG. 1. In this case the two leaf-spring assemblies are arranged on the outside, and are bent in an S-shape and consist of several individual leaf-springs that are separate from one another. In its upper end it has the attachment with the damper mass (1). In the lower end region, the spring assemblies are firmly connected to the support device (11). A displacement device is mounted on the support device and can be displaced in the direction (8) along the transverse connection of the support device. In the embodiment shown, this displacement device is equipped with a drive system (6): These are: (6.1): drive motor, (6.2): displacement spindle, (6.3): spindle nut. The displacement device can be operated manually, pneumatically, hydraulically or pneumatically. The displacement unit (5), which can be slid back and forth along the direction (8), is connected to the support device (1) of the guide springs (3)(4) on the left-hand side. When the device (5) is moved to the right (8), the damper mass (1) is also moved to the right, as a result of which the leaf-spring assemblies (2) on both sides are bent further up compared to their original bending or are deflected further in the direction (8) (enlargement of the original "S-shape"). This reduces their stiffness in relation to the perpendicularly (9) effective vibration forces, which results in a drop in the frequency of the system. Consequently, when shifted to the left, the original deflection of the leaf-springs is reduced (reduction of the "S-shape"), which leads to increased stiffness and a higher frequency.

Figure 3:
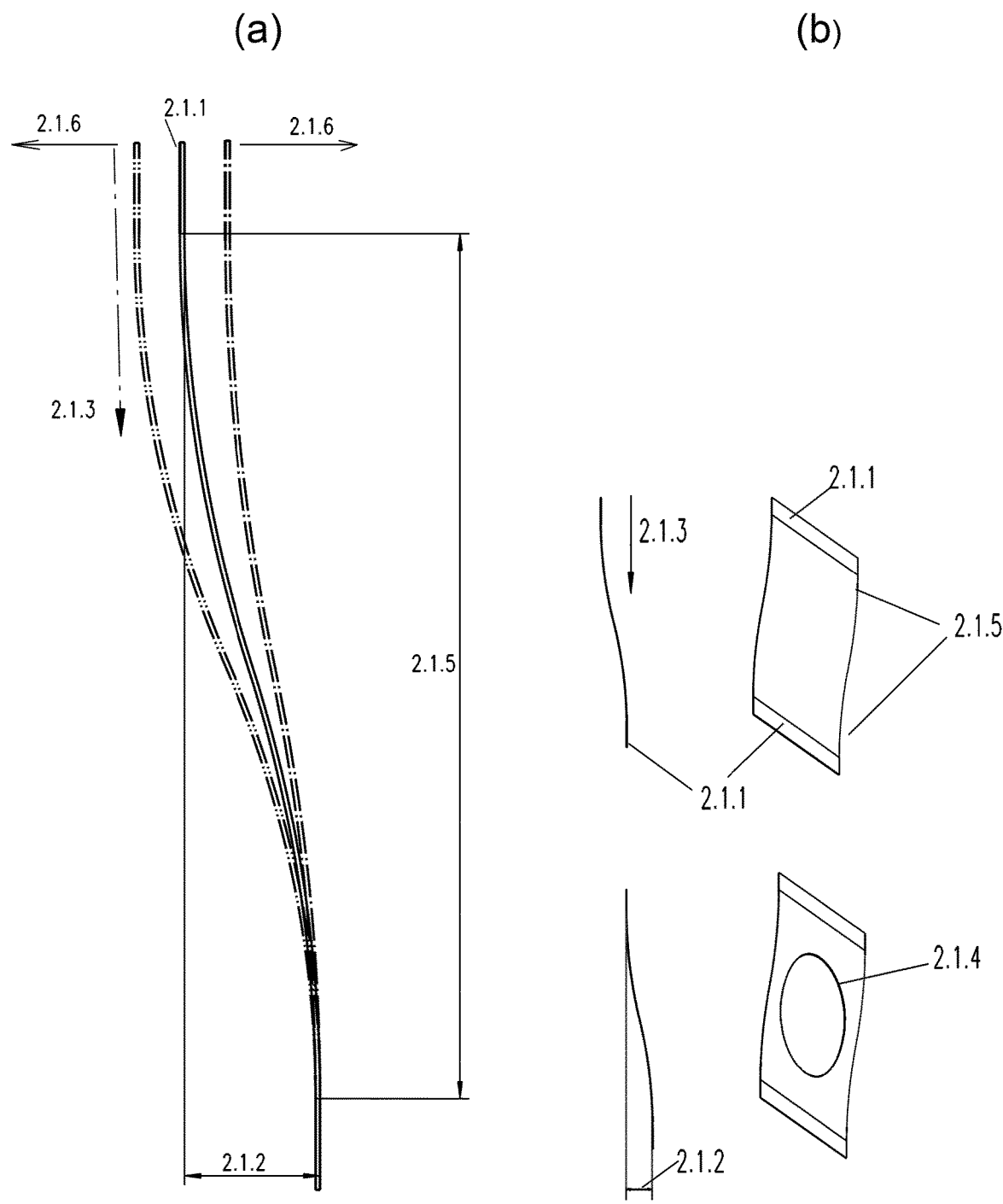
FIG. 3(a): shows a side view of a single leaf-spring of the one-dimensional mass damper according to the invention.
FIG. 3(b): shows perspective views of various embodiments of the leaf-spring according to the invention.

FIG. 3 (a) (b) shows details of a single leaf-spring (2.1) according to the invention, which is preferably used as a package of several such leaf-springs in the tuned mass damper according to the invention. FIG. 3(a) represents the side view of such a spring in a force-free state (continuous line). (2.1.1) represents the end region to which the spring is clamped or fastened. The marked dimension (2.1.2) represents the original pre-bent deflection of the spring, corresponding to the form of the S-shape of the spring. The dimension 2.1.6 indicates the direction of the additional or reduced deflection of the spring when the mass is displaced in the direction (2.1.6) compared to the initial deflection (2.1.2). The corresponding springs are drawn accordingly (dash-dot lines). With a swinging mass (1), the leaf-springs are resiliently bent in the load direction (2.1.3). Furthermore, the free spring length (2.1.5) is shown for the three spring states. FIG. 3(b) shows several perspective views of the leaf-spring of FIG. 3(a) for clarity. In a special further embodiment, such a leaf-spring or leaf-spring assembly has a central recess (2.1.4). which can be useful for the dynamic natural frequency change of the spring.

Figure 4:
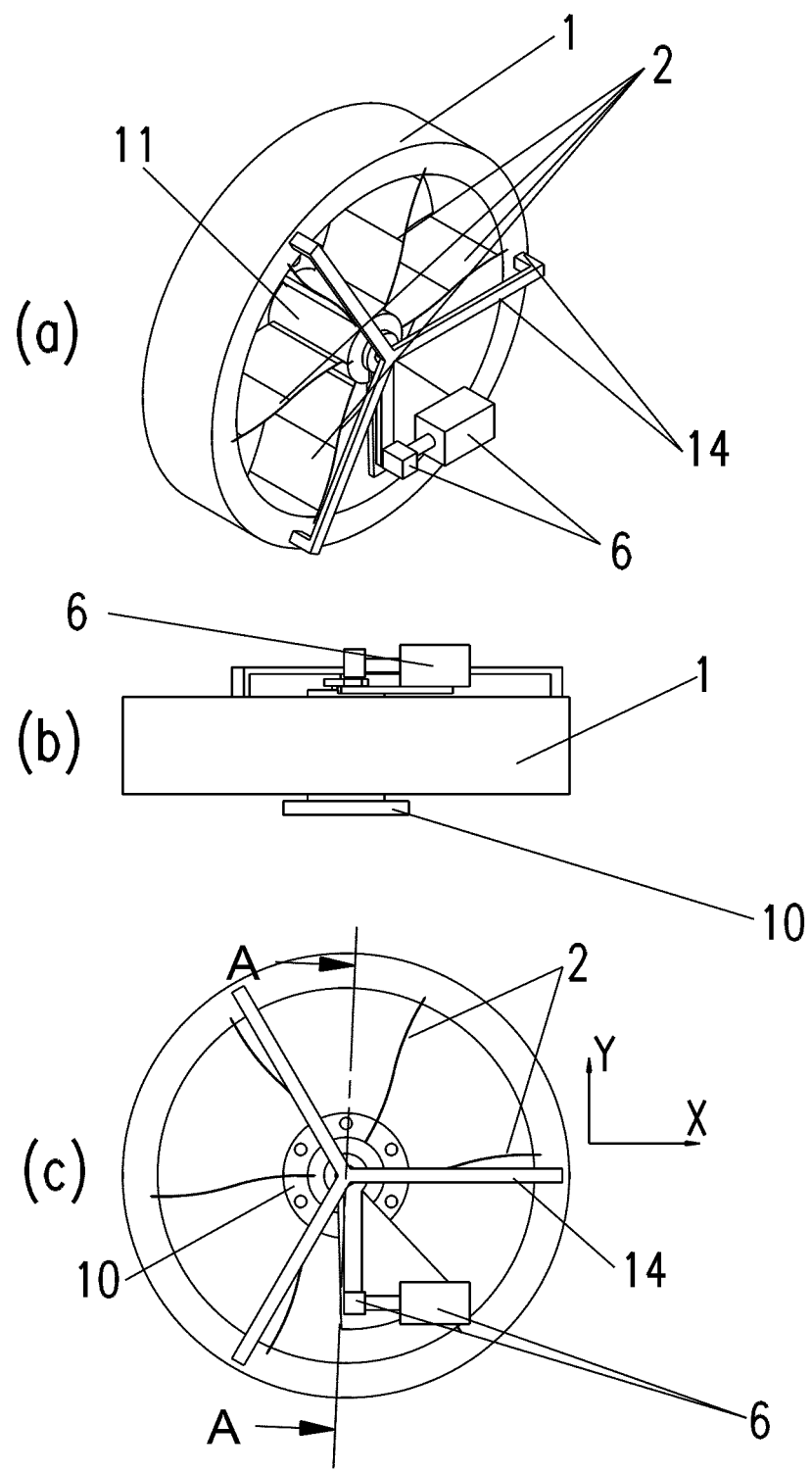
FIG. 4(a): shows a perspective view of an embodiment of a two-dimensional mass damper according to the invention.
FIG. 4(b): shows a top view of the embodiment of the two-dimensional mass damper according to the invention.
FIG. 4(c): shows side view of the embodiment of the two-dimensional mass damper according to the invention.
Figure 5:
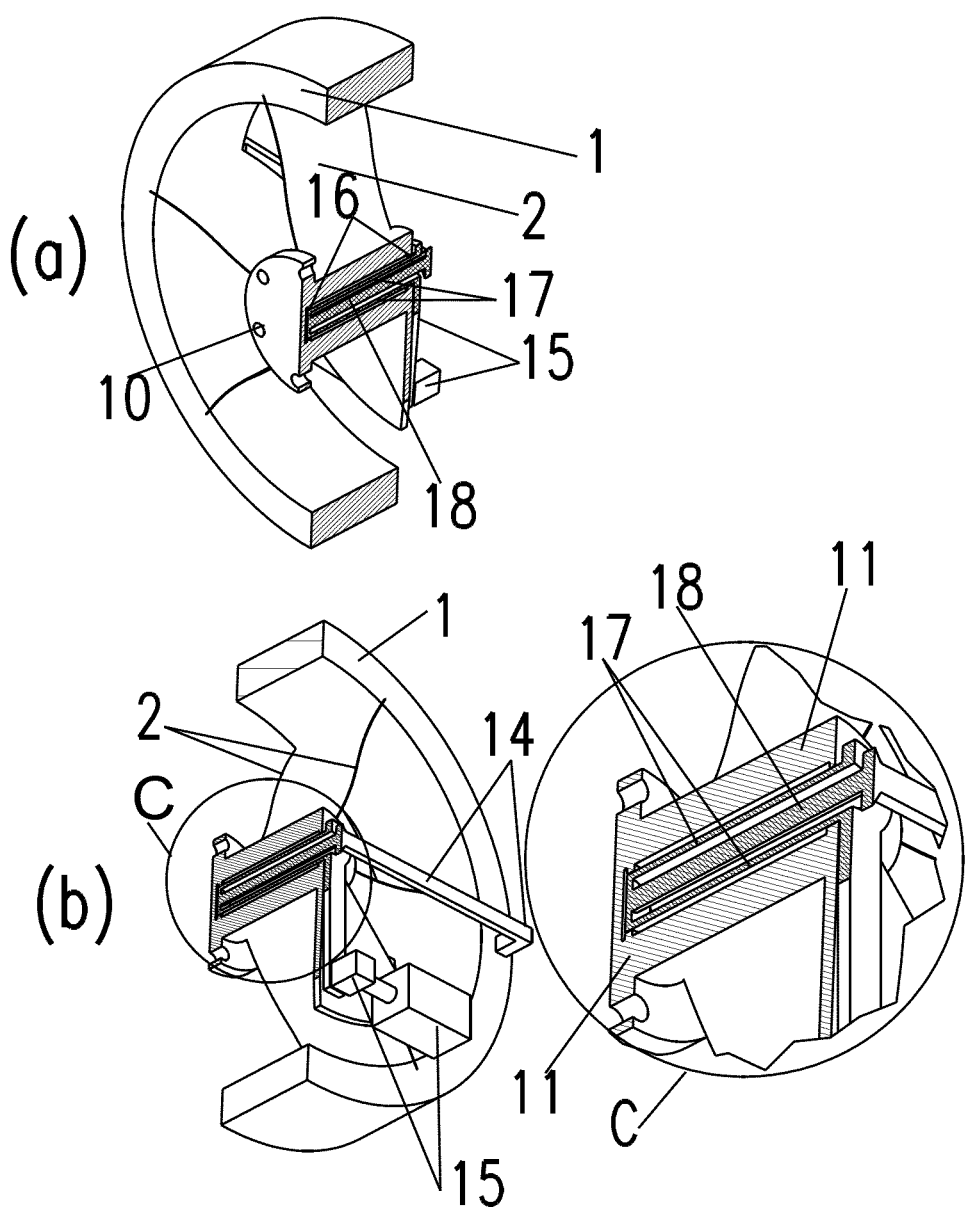
FIG. 5(a), (b): show sectioned perspective views of a rotating unit of the two-dimensional mass damper according to the invention.
Figure 6:
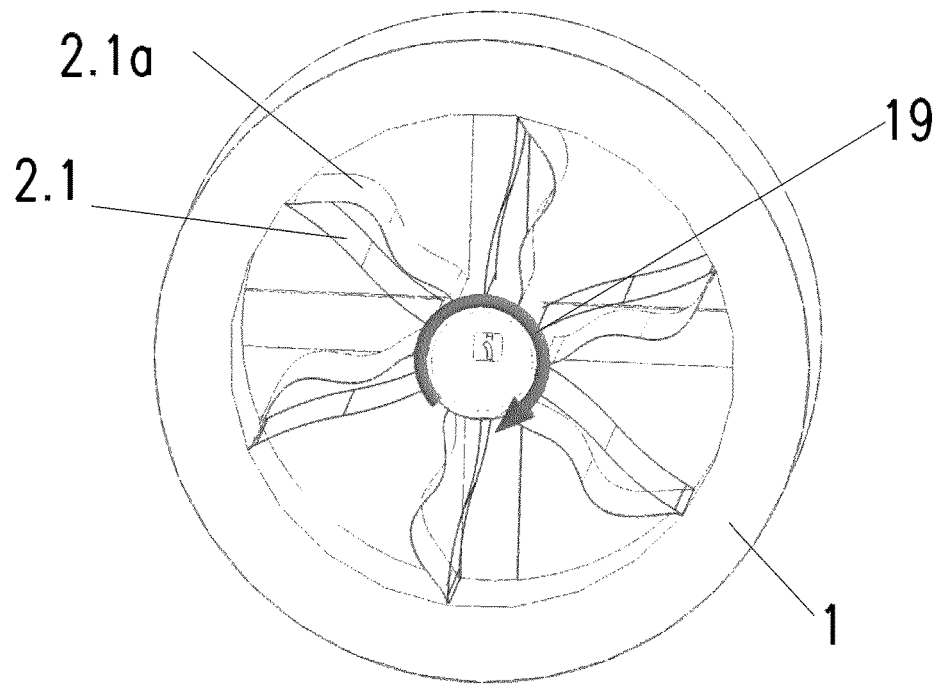
FIG. 6: shows a view of an embodiment of a leaf-spring assembly of the two-dimensional mass damper according to the invention

FIGS. 4, 5 and 6 show an embodiment of the damper according to the invention, which is two-dimensional, i.e. effective in a selected plane. FIG. 4(a) shows a perspective view of such an embodiment. FIG. 4(b) shows the view from above and below, respectively, and FIG. 4(c) shows the view in a side view. (1) represents the damper mass, which preferably has a ring shape and is rotatably mounted about an imaginary axis in the center of the circular shape formed by the mass perpendicular to the plane of the ring. However, any other geometric shape can also be chosen, such as a triangle, square, rectangle or any polygon. It is essential that there is free space for the leaf-springs within the mass body 1. The support unit (11) with connection surfaces (10) for the vibration system is also arranged concentrically. The mass ring is connected to said concentrically mounted support unit (11) via several, in the shown case six pre-bent S-shaped leaf-spring assemblies (2), in this specific case evenly distributed and arranged in a star shape, (the leaf-spring assemblies can also be unevenly distributed, if different frequencies should be damped in different directions). One end or clamping region (2.1.1) of the leaf-spring assembly is connected to the mass ring (1), and the second end or clamping region is connected to the support unit. The support unit can be rotated in relation to the mass ring via rotatable adjusting levers and a drive (6), as a result of which all existing leaf-spring assemblies (2) bend to a greater or lesser extent, depending on the direction of rotation, compared to their initial bending. The stiffness of the damper can thus be easily adjusted and adapted to the disturbance frequencies of the vibration system. FIG. 5 (a) (b) shows details of the rotating unit (14-18) in the center of the damper. (14) represents an adjusting lever, (15) a torsion lever, (16) the pivot bearing, (17) a torque tube, and (18) a torsion bar. In order to enable the required freedom of movement of the mass (1), the sequential connection of the torsion tube (17) with the torsion bar (18) is provided. Together these form an easily bendable torsion bar. In order to achieve the lowest possible radial stiffness influence of the pivot bearing on the overall system, even at low frequencies, it is also possible to arrange several tubes in a meandering configuration. FIG. 6 shows the same embodiment as in FIGS. 4 and 5. (2.1) represents the leaf-spring assemblies before the start of the adjustment, while (2.1.a) shows the same leaf-spring assembly after rotation relative to the concentrically mounted support unit in the indicated direction of the arrow (19), which leads to greater bending (deflection) of the individual leaf-spring assemblies and thus to a reduced stiffness and consequently a shift towards low frequencies.

Figure 7:
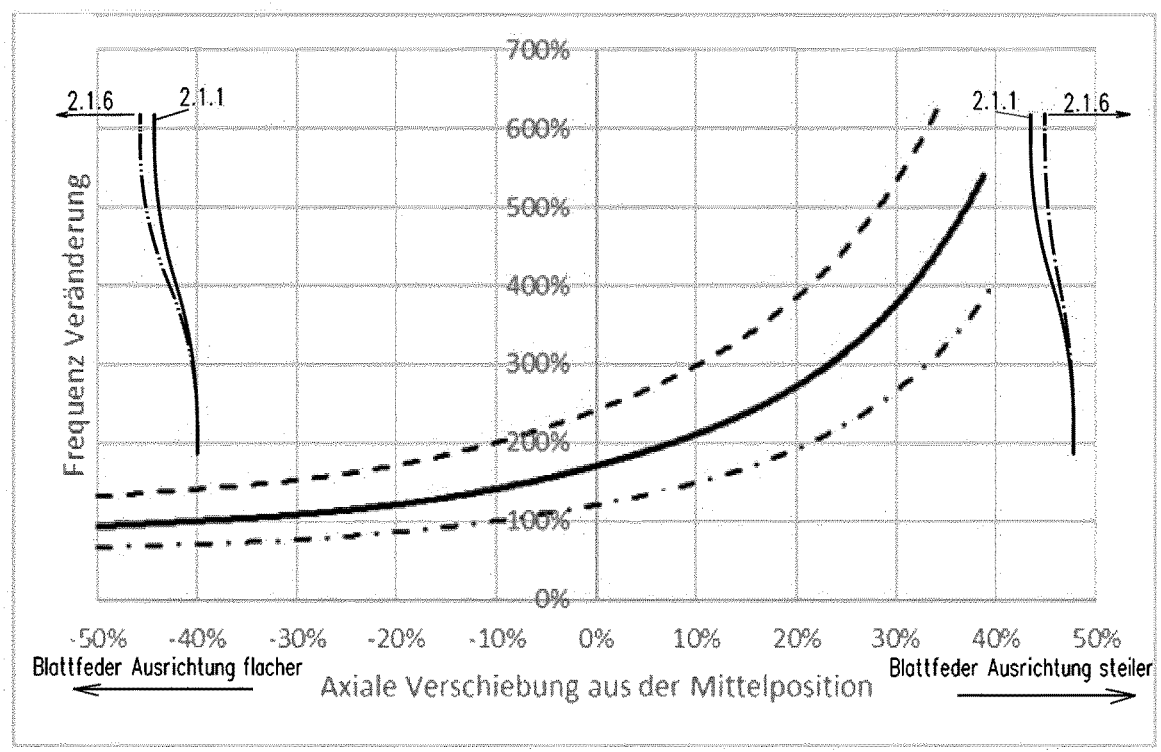
FIG. 7: shows characteristic curves of three leaf-spring assemblies with different initial stiffness.

FIG. 7 shows a typical characteristic curve (frequency change of the vibration system with respect to axial displacement of the leaf-spring) of three leaf-spring assemblies with different initial stiffness. The initial stiffness is generally determined, among other things, by the number of individual springs, the thickness of the individual springs, the free spring length and the original pre-bending in the S-shape. The central solid line represents the characteristic curve of a leaf-spring assembly with a specific stiffness. The upper dashed characteristic curve depicts the curve for a leaf-spring assembly with comparatively higher stiffness, while the lower dashed characteristic curve represents the corresponding relationship for a comparatively soft spring arrangement. The X-axis value indicates the percent of positive or negative displacement or rotation versus the force-free pre-bent spring (0%). It can be seen that with a positive shift (0 to +50%) the leaf-spring orientation becomes steeper, which leads to a significant increase in frequency. A negative shift (0 to −50%) leads to a flatter leaf-spring alignment and thus to a lower frequency. It can be seen from all three curves that with an additional deflection/bending of the springs, the frequency of the absorber system decreases and increases with a reduction in the deflection/bending. Here, when the reduced deflection is +20% compared to the original deflection, the frequency increases by about 100% compared to the original frequency. With +30% relative reduced deflection/bending, a frequency increase of 150-200% is already achieved, and with an additional reduction in deflection of +40% compared to the initial deflection, the frequency change already increases by up to 400%. If, on the other hand, the original deflection/bending is increased compared to the initial value (negative values on the X-axis) by corresponding displacement or rotation then reduces the stiffness of the leaf-springs, which leads to a lowering of the frequency. With a 20% increase (−20%) of the deflection, the frequency decreases by about 20%, with a 30% increase in the deflection (−30%), the frequency decreases by about 40%, and with a 40% increase in the deflection (−40%) by about 50%. Further increases in the deflection only have a very small influence on the frequency.

Figure 8:
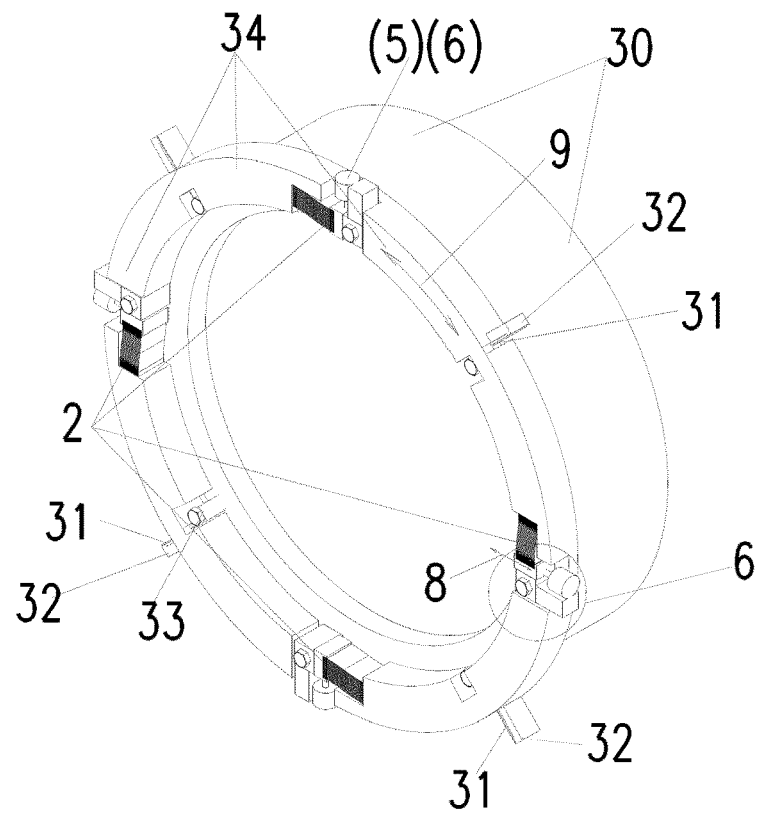
FIG. 8(a): shows perspective view of an embodiment of the tuned mass damper according to the invention with a circular or tangential arrangement of leaf-spring assemblies.
FIG. 8(b): shows close-up perspective view of the embodiment of the tuned mass damper according to the invention.
Figure 8:
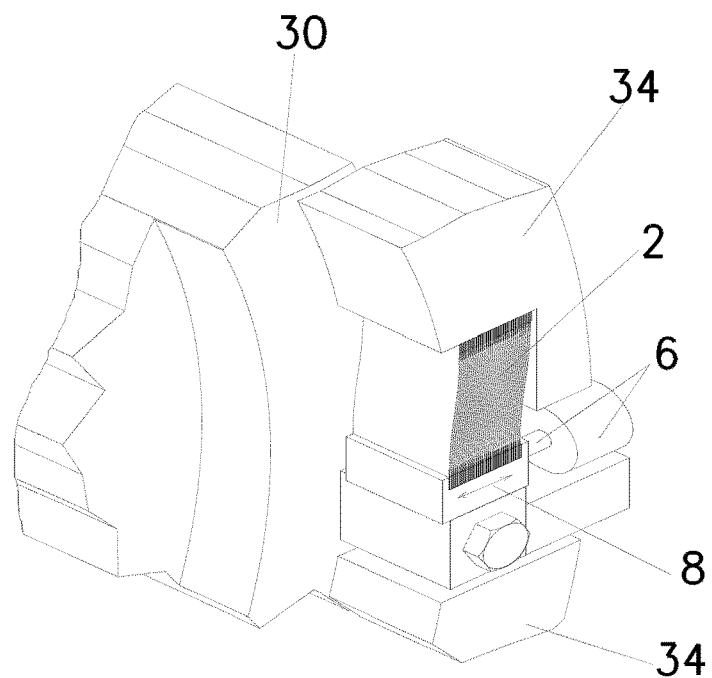

FIG. 8 (a) (b) shows an embodiment of the tuned mass damper according to the invention with a circular or tangential arrangement of the leaf-spring assemblies. This allows rotating components to be adaptively damped. A damper mass (34) is coupled to the circularly vibrating machine or a support part of this machine via tangentially arranged packages of leaf-spring assemblies (2). In the specific case, four (but it can also be three to eight) preferably evenly distributed packages of leaf-spring assemblies (2) (comprising 20-40 individual bent leaf-springs) are attached to the damper mass. The damper mass itself comprises corresponding, preferably circular segments, which are connected to one another via the said leaf-spring assemblies. As described, the leaf-spring assemblies are equipped with the appropriate displacement devices (6) for adjusting the spring stiffness. The frequency of the system is thus adjusted by moving the spring units (2) along their direction of displacement (8) change in the curved S-shape). The damper mass segments (34) are also connected to the rotating support unit (30) or to the rotating machine itself via correspondingly arranged guide springs (31)(33).

Figure 9:
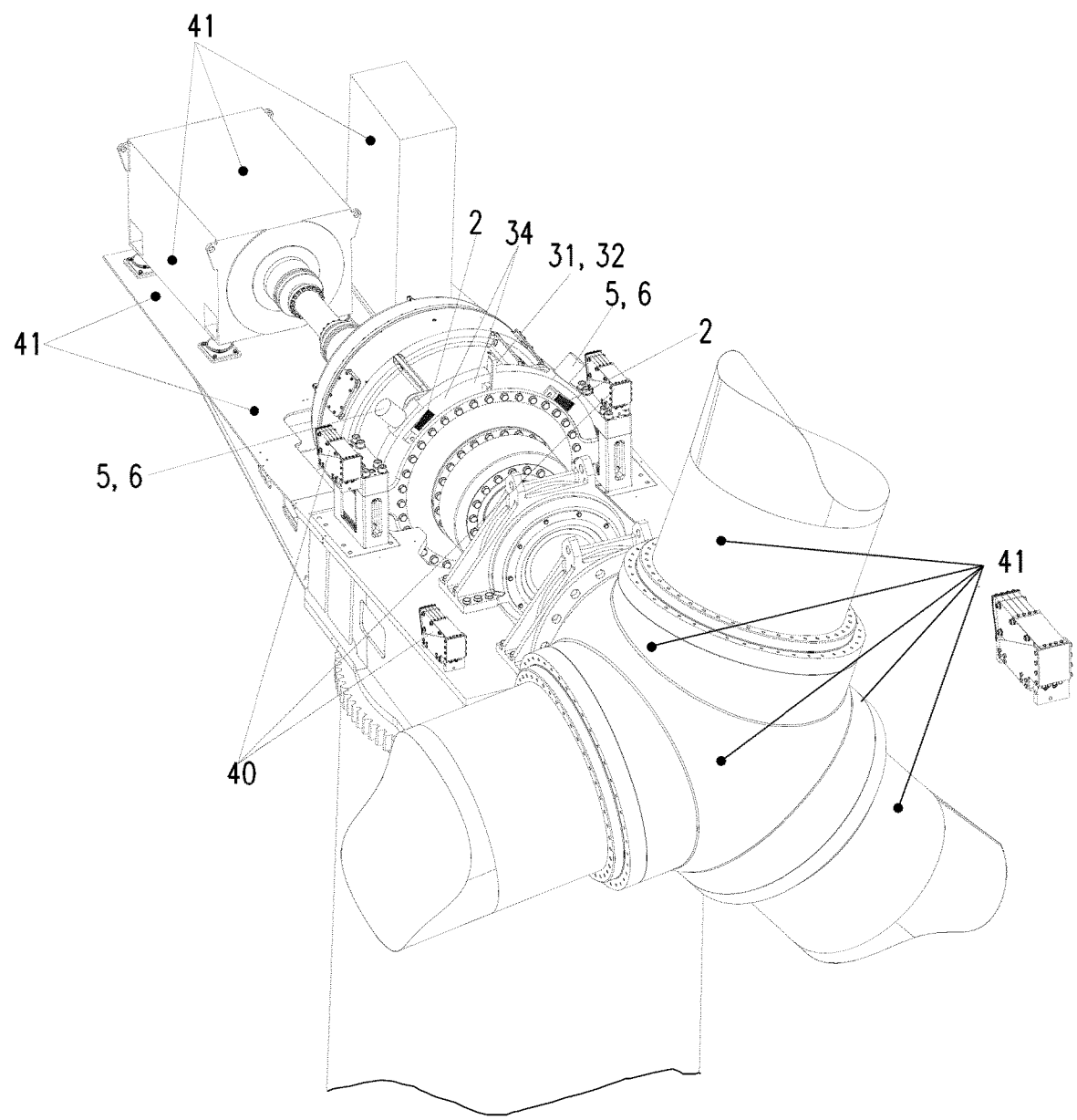
FIG. 9: shows a wind power plant with a gear in which a circular tuned mass damper according to the invention as shown in FIGS. 8(a), (b) is installed.

FIG. 9 shows a wind power plant with a gear in which a circular tuned mass damper according to the invention as shown in FIG. 8 is installed (2)(5(9(6)(31)(32(34). The damper is built into the transmission in such a way that it can absorb torsional vibrations from the transmission. Instead of an annular tuned mass damper according to the invention, individual absorbers arranged in a correspondingly circular manner according to FIG. 1 or 2 can also be used. Positions (40) and (41) represent attachment points on the wind turbine. The tuned mass damper according to the invention can also be connected to the rotor hub.

Figure 10:
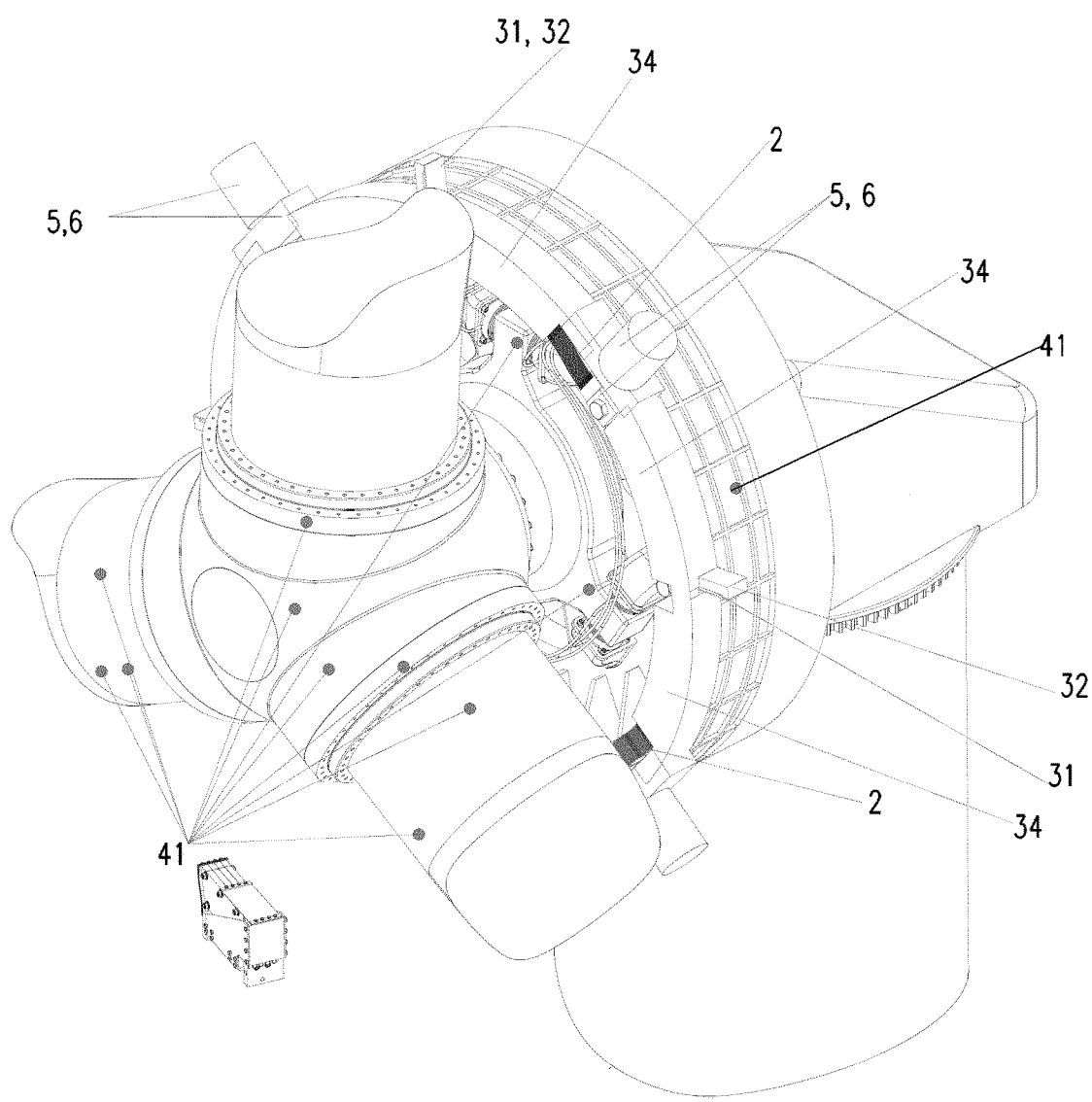
FIG. 10: shows a direct drive wind turbine using a circular tuned mass damper according to FIGS. 8(a), (b)

FIG. 10 shows a direct drive wind turbine (without gearbox) using a circular tuned mass damper according to FIG. 8. The circular tuned mass damper according to the invention can be mounted both in the stator and in the rotor of the generator. Otherwise, the same conditions apply as for the system with gearbox as described above.

Figure 11:
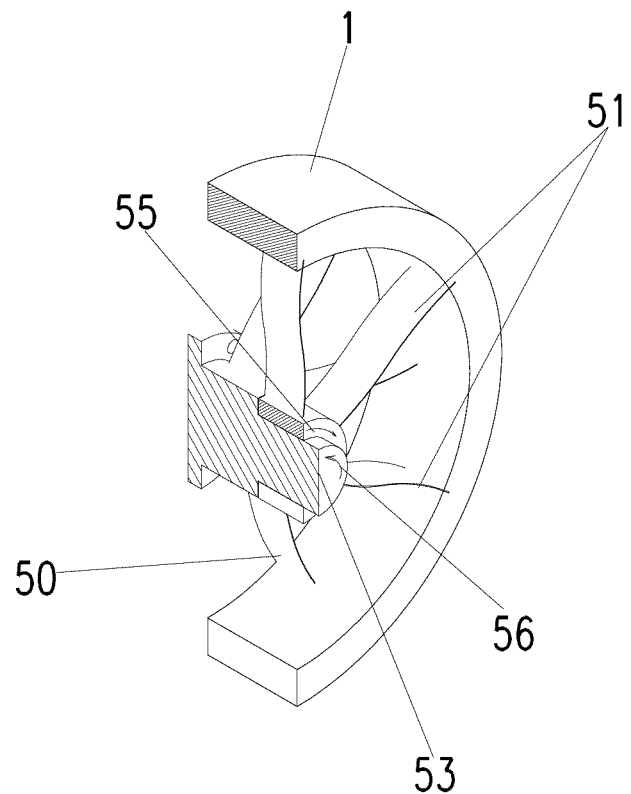
FIG. 11(a): shows a sectioned perspective view of further embodiment of the two-dimensional mass damper according to the invention.
FIG. 11(b): shows a perspective view of the further embodiment of the two-dimensional mass damper according to the invention.
Figure 11:
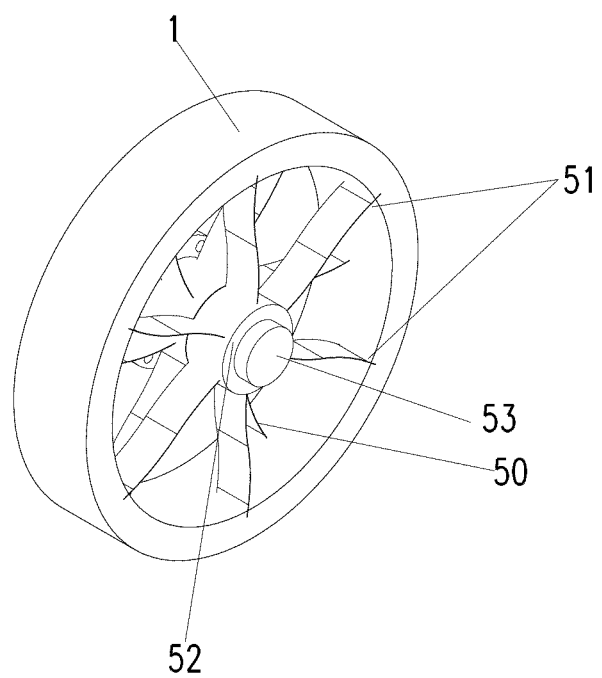

FIG. 11 shows a modified embodiment of the damper according to the invention according to FIGS. 4-6 in a perspective view. (a) shows a half-side section through the ring shape of the damper, while (b) shows the complete ring shape. In this embodiment, two stars made of leaf-springs or leaf spring packages are connected together with a ring-shaped mass (1). There is a front stack of leaf-springs (51) and a rear stack of leaf-springs (50) in the shape of a star. Both are arranged in opposite directions to each other and can be moved, so that both stars experience the same radial stiffness changes when they rotate in relation to one another. The hub (52) and the bolt (53) are turned against each other with a flanged gear drive or a lever and a force element in order to set the desired stiffness.

The invention claimed is:

1. A one-or two-dimensionally effective tuned mass damper for a vibration system, which is adaptable to disturbance frequencies, comprising a machine, a vehicle, or an installation, which is exposed to said disturbance frequencies to be damped, adaptive tuned mass damper comprising
   (i) a damper mass,
   (ii) at least one leaf-spring assembly capable of vibrating in case of force flows, the leaf-spring assembly is firmly connected directly or indirectly to a support unit of said machine or installation and directly or indirectly to the damper mass and has a predetermined stiffness, and
   (iii) a device for changing the predetermined stiffness of the leaf-spring assembly and adjusting the frequency of the vibration system to the disturbance frequencies, the device for changing the predetermined stiffness being connected both to the leaf-spring assembly as well as to the support unit of the vibration system,
   wherein
   (iv) the at least one leaf-spring assembly has one or more leaf-springs stacked in parallel, which are pre-bent about a transverse axis thereof in a force-free state, a longitudinal axis of the leaf-springs or the leaf-spring assembly being defined by a direction of force applied during operation,
   (v) two end or clamping regions of the individual leaf-springs or the leaf-spring assembly are deflected or offset relative to one another by a defined, preset amount with respect to their position in relation to the longitudinal axis, said predetermined deflection corresponding to a specific stiffness of the leaf-spring assembly and a specific frequency of the vibration system connected to the leaf-spring assembly, and
   (vi) the device for changing the predetermined stiffness comprises a displacement device, a rotary device, a piezo element, or a bimetallic element is designed and arranged such that it allows a reversible bending of the pre-bent leaf-spring assembly in a direction perpendicular to the longitudinal axis, such that depending on the direction of displacement or rotation by the device for changing the predetermined stiffness, an increase or decrease in the preset deflection of the pre-bent leaf-spring assembly is achieved, whereby the predetermined stiffness of the leaf-spring assembly is changeable along the longitudinal axis and the frequency of the vibration system is adaptable to a changed disturbance frequency.

2. The adaptive tuned mass damper according to claim 1, wherein the leaf-spring assembly or the leaf-springs are in an S-shape.

3. The adaptive tuned mass damper according to claim 2, wherein the leaf-spring assembly or the leaf-springs are bent symmetrically in an S-shape in a central region.

4. The adaptive tuned mass damper according to claim 1, wherein the two end or clamping regions of the individual leaf-springs or the leaf-spring assembly are arranged parallel to one another.

5. The adaptive tuned mass damper of claim 1, wherein the leaf-spring assembly has at least two leaf-springs.

6. The adaptive tuned mass damper according to claim 1, wherein the stacked leaf-springs of the leaf-spring assembly have a distance from one another of <2 mm or lie directly on top of one another, such that the vibration system experiences additional friction damping.

7. The adaptive tuned mass damper according to claim 6, wherein the stacked leaf-springs of the leaf-spring assembly are separated from one another by elastic layers having a thickness of >0 and <2 mm.

8. The adaptive tuned mass damper according to claim 1, wherein the leaf-spring assembly in the force-free state has a deflection of 15-30% of a free spring length in the direction of the longitudinal axis or in a load direction.

9. The adaptive tuned mass damper according to claim 8, wherein the free spring length is 50-500 mm.

10. The adaptive tuned mass damper according to claim 1, wherein the leaf-springs of the leaf-spring assembly have a round or oval bore in the central region for influencing a spring dynamic natural frequency.

11. The adaptive one-dimensionally effective tuned mass damper according to claim 1, wherein the damper mass is composed of one or more plates packed together and is laterally delimited at opposite points by at least two parallel leaf-spring assemblies, which is firmly connected through the first end or clamping region with the damper mass and through their second end or clamping region to the support unit respectively, the damper mass being configured to vibrate in a direction which corresponds to the longitudinal axis or loading direction of the leaf-spring assemblies.

12. The adaptive tuned mass damper according to claim 11, wherein the device for changing the predetermined stiffness of the leaf-spring assembly is a mechanical, hydraulic, pneumatic, or electrical displacement device which is arranged on the support unit above or below the damper mass and the leaf-spring assemblies.

13. The adaptive tuned mass damper according to claim 12, wherein the damper mass is guided and held parallel to the displacement direction by guide springs during movement thereof in the displacement direction caused by the changed deflection of the leaf-spring assemblies.

14. The adaptive, two-dimensionally effective tuned mass damper according to claim 1, wherein the damper mass is arranged in a ring around the support unit, which is concentrically mounted, in such a way that the damper mass is able to vibrate in a plane radially to the support unit, and is connected therewith through three to eight leaf-spring assemblies which are arranged in a star shape and at a selected same or different distance angle from one another within the damper mass ring and are connected to the damper mass via the first end or clamping region and to said concentrically mounted support unit via their second end or clamping region.

15. The adaptive tuned mass damper according to claim 14, wherein the device for changing the predetermined stiffness of the leaf-spring assemblies comprises a mechanically, hydraulically, pneumatically, or electrically operated, concentrically mounted rotating device, with which rotating of the concentric damper mass relative to the concentrically mounted support unit is carried out, so that a change in the predetermined deflection of all radially arranged leaf-spring assemblies is achieved.

16. An adaptive torsionally effective tuned mass damper according to claim 1, wherein the damper mass is arranged in a ring around the concentrically mounted support unit of the machine, which executes circular vibrations when excited, and the ring-shaped damper mass comprises at least two or three segments of a circle, which are connected by a corresponding number of leaf-spring assemblies, said leaf-spring assemblies being arranged tangentially with respect to their longitudinal axis thereof in such a way that the leaf-spring assemblies have a dampening effect in an event of rotational vibrations of the support unit or the machine.

17. The adaptive tuned mass damper according to claim 1, wherein when force is applied, a ratio of vibration travel of the damper mass to the initiated vibration travel of the vibration system to be damped is >100-400 in an undamped state.

18. The adaptive tuned mass damper according to claim 1, wherein with further deflection of the leaf-spring assembly by 30% of an original deflection in a direction which increases a stiffness of the leaf-spring assembly under load, a double to threefold increase in frequency is achieved.

19. The adaptive tuned mass damper according to claim 1, wherein with further deflection of the pre-bent leaf-spring assembly by 30% of an original deflection in a direction which reduces a stiffness of the leaf-spring assembly under load, the frequency is reduced by 20-50%.

20. The adaptive tuned mass damper according to claim 1, further comprising one or more additional damping elements.

21. A use of a tuned mass damper according to claim 1, to reduce or eliminate disturbance frequencies in a machine, a vehicle, or an installation, which are caused by rotating components of a transmission, generator, a drive train or of rotor blades or rotor hubs.

22. A wind power plant comprising a tuned mass damper according to claim 1.

* * * * *